United States Patent
Haas et al.

(10) Patent No.: US 9,694,982 B2
(45) Date of Patent: Jul. 4, 2017

(54) APPARATUS FOR TRANSPORTING SUBSTANTIALLY NON-RIGID SHAPED BODIES

(71) Applicant: HAAS FOOD EQUIPMENT GMBH, Vienna (AT)

(72) Inventors: Johannes Haas, Vienna (AT); Josef Haas, Leobendorf (AT); Christoph Jiraschek, Frederiksberg (DK); Stefan Jiraschek, Koenigsbrunn (AT)

(73) Assignee: Haas Food Equipment GmbH, Vienna (AT)

( * ) Notice: Subject to any disclaimer, the term of this patent is extended or adjusted under 35 U.S.C. 154(b) by 0 days.

(21) Appl. No.: 14/891,692

(22) PCT Filed: May 16, 2014

(86) PCT No.: PCT/EP2014/060054
§ 371 (c)(1),
(2) Date: Nov. 17, 2015

(87) PCT Pub. No.: WO2014/184335
PCT Pub. Date: Nov. 20, 2014

(65) Prior Publication Data
US 2016/0107839 A1    Apr. 21, 2016

(30) Foreign Application Priority Data
May 17, 2013    (AT) .................... A 414/2013

(51) Int. Cl.
*B65G 15/60*    (2006.01)
*B65G 21/10*    (2006.01)
(Continued)

(52) U.S. Cl.
CPC ............. *B65G 21/105* (2013.01); *A21C 9/08* (2013.01); *B65G 15/00* (2013.01); *B65G 15/60* (2013.01); *B65G 2207/26* (2013.01)

(58) Field of Classification Search
CPC ............................ B65G 21/105; B65G 15/60
(Continued)

(56) References Cited

U.S. PATENT DOCUMENTS 2,693,269 A * 11/1954 Bentley ................. B65G 39/09
193/35 R
3,993,185 A * 11/1976 Fleckenstein .......... B65G 21/06
198/813
(Continued)

FOREIGN PATENT DOCUMENTS

DE    102010001969 A1    8/2011
EP    0548661 A1    6/1993

*Primary Examiner* — Douglas Hess
(74) *Attorney, Agent, or Firm* — Laurence A. Greenberg; Werner H. Stemer; Ralph E. Locher

(57) ABSTRACT

An apparatus for transporting endless dough strips or substantially non-rigid shaped bodies such as, in particular, biscuit dough shaped bodies and the like, includes a machine frame, a closed circulating conveyor belt, a deflecting roller which contacts the conveyor belt on the inner side for deflection and has a deflection axle or shaft which is mounted rotationally laterally on the machine frame, and a drive roller which contacts the conveyor belt on the inner side for driving and has a drive shaft which is mounted rotationally laterally on the machine frame and is driven by a drive. The drive roller is connected to the machine frame by a pivoting apparatus.

19 Claims, 12 Drawing Sheets

(51) Int. Cl.
*A21C 9/08* (2006.01)
*B65G 15/00* (2006.01)

(58) Field of Classification Search
USPC ............................ 198/842, 861.1; 193/37
See application file for complete search history.

(56) References Cited

U.S. PATENT DOCUMENTS

| | | | | |
|---|---|---|---|---|
| 4,089,408 A * | 5/1978 | Vanderhoof | ........... | B65G 17/34 198/440 |
| 4,134,488 A * | 1/1979 | Bigney | ................. | B65G 39/12 198/827 |
| 4,365,535 A * | 12/1982 | Buttner | ................. | G10D 13/06 248/412 |
| 4,649,631 A * | 3/1987 | Orth | ........................ | B29C 43/44 29/426.5 |
| 5,027,940 A * | 7/1991 | Woodward | ............ | B65G 45/04 198/500 |
| 5,934,449 A * | 8/1999 | Dolan | .................... | B65G 17/08 198/806 |
| 6,161,683 A * | 12/2000 | Wallis | .................... | B65G 23/44 198/813 |
| 6,281,478 B2 * | 8/2001 | Chandler | .................... | 198/586 |
| 6,371,283 B1 * | 4/2002 | Manchester | ........... | B65G 23/44 198/813 |
| 6,598,378 B1 * | 7/2003 | Pottier | .................... | B65B 11/00 492/45 |
| 6,948,609 B2 * | 9/2005 | Finger | .................... | B65G 45/16 198/497 |
| 7,584,835 B2 * | 9/2009 | Wimsatt | ................. | B65G 45/14 198/494 |
| 7,802,674 B1 * | 9/2010 | McGuire | ................ | B65G 23/44 198/816 |
| 8,074,793 B2 * | 12/2011 | Jager | ..................... | B65G 21/06 198/435 |
| 8,328,006 B2 * | 12/2012 | Mott | ..................... | B65G 15/60 198/842 |
| 8,376,130 B2 * | 2/2013 | Deyanov | .............. | B65G 15/105 198/817 |
| 8,387,781 B2 * | 3/2013 | Mott | ..................... | B65G 15/60 198/842 |
| 8,469,182 B2 * | 6/2013 | Alotto | .................... | B65G 23/44 198/813 |
| 8,607,968 B2 * | 12/2013 | Mott | ..................... | B65G 15/60 198/842 |
| 2002/0092726 A1 * | 7/2002 | Kiviranta et al. | | |

* cited by examiner

APPARATUS FOR TRANSPORTING SUBSTANTIALLY NON-RIGID SHAPED BODIES

BACKGROUND OF THE INVENTION

Field of the Invention

The invention relates to an apparatus for transporting substantially non-rigid shaped bodies or endless dough strips such as in particular biscuit dough shaped bodies and the like, comprising a machine frame, a closed circulating conveyor belt, a deflecting roller, which contacts the conveyor belt on the inner side for deflection and whose deflection axis is mounted rotationally laterally on the machine frame, a drive roller which contacts the conveyor belt on the inner side for driving and whose drive shaft is mounted rotationally laterally on the machine frame and is driven by a drive.

Apparatuses for transporting dough strips, for example, for supply to a rolling-out or stamping-out apparatus for biscuit dough shaped bodies have been known for a long time.

In these conventional apparatuses, an endless conveyor belt is guided around a plurality of deflecting rollers and driven by means of at least one drive roller. Optionally the conveyor belt is deflected sharply over a transfer edge of a transfer blade to enable the transfer to a further module of a production line for baked products.

In particular in the industrial manufacture of food products and baked products, uniform quality, hygiene and as far as possible interruption-free operation of the machines are of great importance. In order to ensure high quality and hygiene, the conveyor belt must be removed at regular intervals and optionally changed. For this purpose in the apparatuses according to the prior art, the machine must be stopped. Subsequently the bearing blocks of the mountings of the individual rollers or rolls on the machine frame are opened. Only then can the rollers be removed, the rotational bearings remaining on the shaft journals. In conventional apparatuses, furthermore the drive and optionally the transmission of the drive must be removed since otherwise the conveyor belt cannot be removed from the apparatus.

This is a time-consuming process during which the entire production line must be stopped.

BRIEF SUMMARY OF THE INVENTION

It is the object of the invention to provide an apparatus for transporting substantially non-rigid shaped bodies which enables a rapid, uncomplicated and clean removal or changeability of the conveyor belt.

The object according to the invention is in particular solved whereby the drive roller is connected to the machine frame by means of a pivoting apparatus.

It is furthermore advantageous for the invention if all further components of the apparatus which are located in the interior of the conveyor belt, are removable. Examples for such components are deflecting rollers, transfer bodies and/or table plates.

Further advantageous features of the invention are that the pivoting apparatus comprises a detachable bearing apparatus for the first bearing point of the drive shaft and a pivotable pivot bearing for the second bearing point of the drive shaft in the machine frame so that a pivoting of the drive shaft and the drive roller with respect to the machine frame is made possible, that the pivot bearing comprises a pivot bearing block in which a radial bearing is provided for mounting the drive shaft and that the pivot bearing is connected via a pivot axis to the machine frame so that the pivot bearing block and the drive shaft mounted therein are pivotable, that the direction of the pivot axis differs from the direction of the axis of rotation of the drive shaft and in particular runs substantially normally to the axis of rotation of the drive shaft, that the drive comprises an output shaft which is rotatably connected to the drive shaft, that the drive comprises a housing which is substantially rigidly connected to the pivot bearing block and/or that the bearing points of the deflecting roller are each designed as detachable bearing devices.

It can further be provided that the detachable bearing device of the deflecting roller comprises a deflecting roller bearing block and a locking element, wherein the deflecting roller bearing block has an opening running substantially in the radial direction for inserting and removing the deflection axis which can be closed by the locking element, that the width of the opening of the deflecting roller bearing block is greater than the diameter of the mounted pivot axis, that the locking element can be moved by means of an actuating element, wherein the actuating element is designed in particular as a tool-less operable actuating element, as a lever, as a lock or as a slider, that a tensioning roller is provided which is pressed onto the outer side of the conveyor belt for tensioning the conveyor belt and/or that a transfer blade is provided which has a transfer edge about which the conveyor belt is deflected.

It can preferably also be provided that the transfer blade is pivotably connected to the machine frame by means of a transfer blade pivot axis, that the transfer blade is connected laterally to the machine frame, wherein the connection is designed to be detachable so that the transfer blade is removable, that all the deflecting rollers and the transfer blade and optionally table plates are connected removably to the machine frame and that the drive roller is connected pivotably to the machine frame so that the endless closed conveyor belt can be changed without dismantling the drive, that the detachable bearing device of the drive roller comprises a recess in the side plate of the machine frame which is opened outwards by means of a radially running opening, that the locking element of the drive roller is arranged rotatably, that a width of the locking element is smaller than the width of the opening and that a further width of the locking element is wider than the opening but smaller than the recess so that the locking element can be positioned in the recess and can be locked by twisting and/or that the drive roller, the drive shaft thereof mounted in the radial bearing, the pivot bearing block and the drive together with housing are arranged pivotably by means of the pivot axis with respect to the machine frame. The different widths are preferably measured in the radial direction of the drive roller or the axis of rotation of the actuating element.

In order to remove the conveyor belt, in principle all the elements arranged inside the conveyor belt should be designed in such a manner that they are either removable or are at least pivotable so that the conveyor belt can be removed laterally.

In one of the present embodiments of the invention, the deflecting rollers are designed to be removable. For this purpose quick release fasteners are provided by which means the rollers can be unlocked. The optionally provided transfer blade is also designed to be removable.

The drive which is connected directly to the drive shaft of the drive roller cannot be unlocked by means of quick release fasteners as a result of the increased weight and the connection to the machine frame. For this reason according to the invention the drive roller is connected pivotably to the machine frame by means of a pivoting apparatus. In particular, this pivotability is designed in such a manner that that side of the drive roller which is not connected to the drive can be pivoted so that its free end projects laterally into a free region of the machine frame. As a result, the conveyor belt can be pulled laterally over the pivoted end of the drive roller and removed from the apparatus through the free region of the machine frame.

The said quick release fasteners are designed as detachable bearing devices. The detachable bearing devices of the deflecting rollers are preferably designed as bearing blocks which each have an opening which can be closed by means of a locking element. The openings are designed in such a manner that the axes can be removed from the bearing block in substantially the radial direction. For example, this is made possible by a radially running groove. The locking element is designed in such a manner that the opening can be closed so that the roller or its axis is fixed in its mounted position. For removal of the deflecting rollers the locking elements of the detachable bearing devices are released and the rollers are removed substantially in the radial direction.

The transfer blade can preferably also be removed. To this end it has an axis of rotation about which the transfer blade can be pivoted. The axis of rotation is substantially normal to the direction of transport of the conveyor belt or parallel to the axes of rotation of the rollers. In the operating position the transfer blade is held by the belt tension in a first position. In this position the transfer blade can also be connected rigidly to the machine frame by means of connecting elements such as, for example, tommy screws. For removal of the transfer blade, the transfer blade can be folded up. As a result of this folding, on the one hand the strain on the conveyor belt is relieved and on the other hand the removal of the transfer blade is facilitated. In particular, the mounting of the transfer blade can be released laterally on the machine frame. As a result, the transfer blade can be pulled from the fastening points and removed from the apparatus.

Preferably table plates are provided to support the conveyor belt. These table plates are connected laterally to the machine frame and substantially follow the course of the conveyor belt. The table plates are connected to the machine frame by means of simple, preferably detachable connecting means. This enables a rapid removal of the table plates.

Once the deflecting rollers, the table plates and the transfer blades have been removed, only the drive roller is provided in the interior of the conveyor belt. In order to be able to remove the conveyor belt, the drive roller is now pivoted. To this end the detachable bearing device is released on one side. The pivoting apparatus according to the invention is provided on the other side of the drive shaft. The drive roller can be pivoted by releasing the bearing device. This pivoting movement is made possible by the pivoting device. During pivoting of the drive roller, on the one hand the drive roller itself but also the drive and the components sitting between drive and drive shaft are co-pivoted. To this end, the pivoting apparatus comprises a pivot bearing block which is arranged pivotably about a pivot axis with respect to the machine frame. The drive or the housing of the drive are connected rigidly to the pivot bearing block. As a result, during pivoting of the drive shaft or the drive roller, the drive is co-pivoted. It is not necessary to separate the drive shaft and the drive to remove the conveyor belt.

The detachable bearing device of the drive roller also comprises a locking element. The connection between drive roller and machine frame is released by this locking element and the shaft can be pivoted. In particular, the drive roller is designed to be pivotable in such a manner that with its free end it points in a direction in which it is freely accessible. As a result, the conveyor belt can be pulled over the freely projecting end of the drive shaft.

The detachable bearing device of the drive shaft is further designed in such a manner that the radial bearings are co-pivoted with the bearing device. They therefore do not need to be removed and also not opened. This has the major advantage that contaminants such as abrasion or lubricant of the radial bearings cannot escape. The same applies to the drive side of the drive shaft. There the drive remains firmly connected to the shaft. An opening of the bearing blocks in the conventional sense is also not necessary.

The quick release fastenings for the deflecting rollers and in particular the bearing points are preferably designed in such a manner that no contamination can occur due to oil or abrasion. According to one embodiment, the deflecting roller is designed as a cylindrical body from which an axle journal projects which is mounted rotatably in the roller with respect to the cylindrical roller. To this end, for example, a ball bearing can be pressed in or provided in the deflecting roller. The axle journal is then mounted in the interior of this ball bearing. Preferably the axle journal is designed to be cylindrical and projects into the quick release closure according to the invention. Optionally the roller is configured to be tubular and has a cavity in its interior. The axle journals projecting on both sides can be interconnected by a rigid axle or be designed as an axle. This rigid axle extends from the left-side mounting to the right-side mounting. The roller is rotatably mounted on both sides by means of radial bearings. Preferably the axle comprising the two axle journals and the deflecting roller, which is configured in particular as tubular, have the same axis of rotation.

The axle journals can optionally also be configured to be polygonal. The polygonal axle journals can be held or mounted in complementary polygonal recesses on the machine frame.

In order to improve the clarity, it is defined that a device which is adapted for holding bearings, in particular rotational bearings, is designated as bearing block. In this case, the bearing block need not be designed in the conventional sense as a two-part separable arrangement but can also be designed as a sleeve, ring, open ring or other body which is suitable for enabling the bearing points or the bearing to mount a shaft or an axle.

The apparatus according to the invention is suitable and/or adapted to be used "in-line" in an industrial production plant for food products. Subsequently the invention is further described by reference to the figures.

DESCRIPTION OF THE INVENTION

Figure 1:
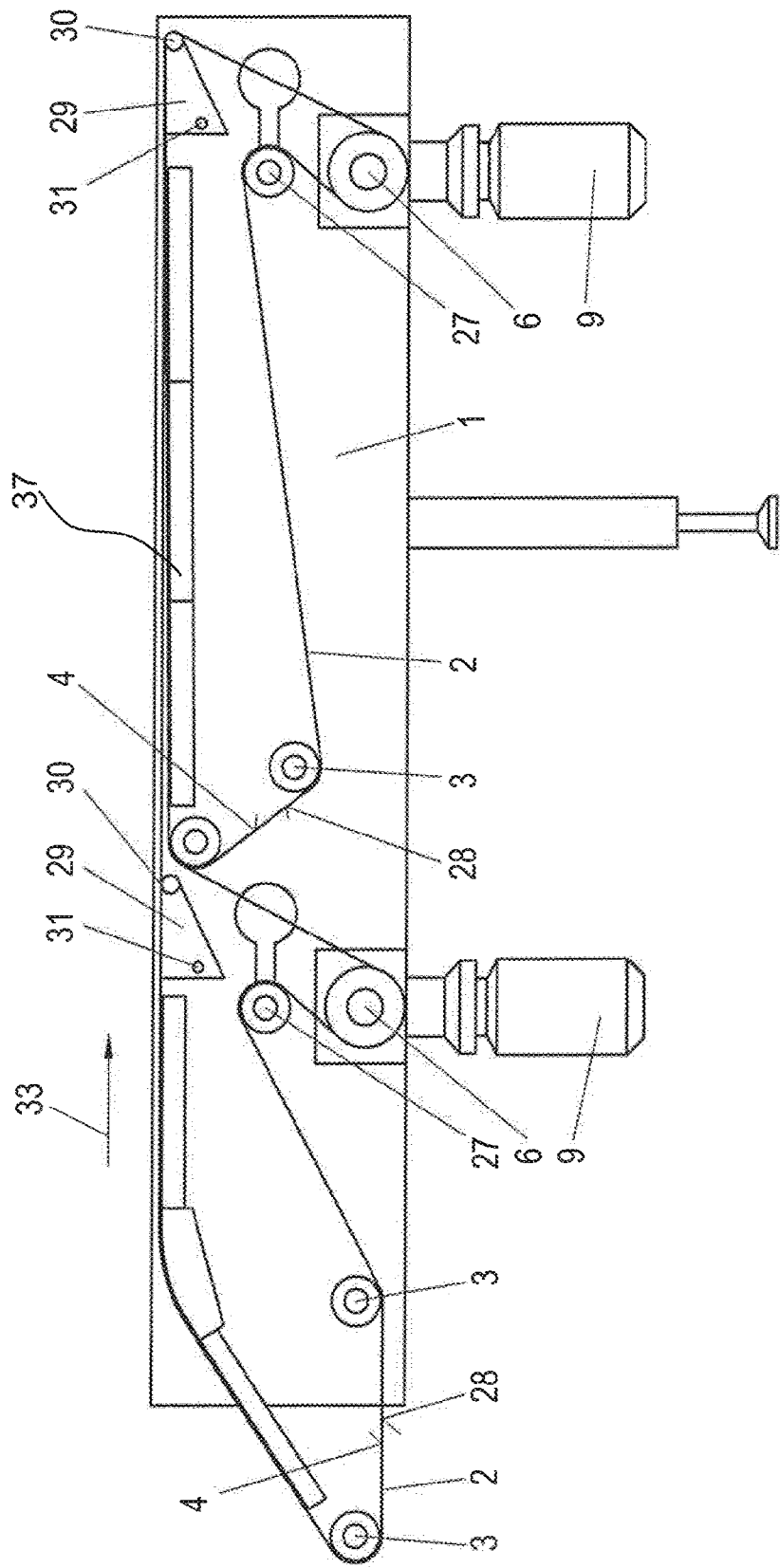
FIG. 1 shows a schematic side view of an apparatus according to the invention where parts of the machine frame are blanked out.

FIG. 1 shows a side view of an apparatus according to the invention comprising a machine frame 1 which for example comprises two rigidly interconnected side plates which are interconnected by means of transverse members. Furthermore, if the apparatus is designed to be free-standing, a plurality of feet are provided for support against the ground. Preferably the apparatus according to the invention is provided "in-line" in a production line for the industrial manufacture of baked products. Optionally the machine frame is thus connected to further components such as, for example, a stamping-out apparatus, a rolling-out apparatus, a baking oven or similar components. In the preferred embodiment two conveyor belts 2 are provided. The conveyor belts 2 are each guided around one or more deflecting rollers 3 and are each guided around at least one drive roller 6. Furthermore, the belt is preferably guided around a tensioning roller 27 and around a transfer blade 29. The deflecting rollers and the drive rollers preferably contact the conveyor belt 2 on its inner side 4. The tensioning roller 27 contacts the conveyor belt in the present embodiment on its outer side 28. The circulating conveyor belt 2 is driven by means of the drive roller 6. In this case, the upper region of the conveyor belt in the diagram follows the transport direction 33. On this side the shaped bodies to be processed and conveyed can be moved along the conveying direction 33.

Respectively one drive 9 is provided for driving the drive rollers 6. This is preferably configured as a rotary drive which is coupled to the drive shaft 8 of the drive roller 6. In the embodiment of FIG. 1 two conveyor belts 2 are arranged in a row, However, it is also consistent with the inventive idea that one a single conveyor belt or however a plurality of conveyor belts are provided.

The transfer blade 29 has a sharp transfer edge 30 around which the conveyor belt is deflected. Furthermore the transfer blade 29 preferably comprises a transfer blade pivot axis 31 about which the transfer blade is pivotable. The transfer blade 29 also contacts the conveyor belt 2 on its inner side 4.

Furthermore table plates 37 are provided in the course of the conveyor belt. These table plates are, for example, connected to the machine frame 1 by means of bolts projecting on both sides. The table plates are preferably connected to the machine frame by simple means corresponding to the prior art. These means are configured in such a manner that a removal, preferably a tool-less removal, of the table plates from the machine frame 1 is made possible. The table plates preferably substantially follow the transport direction 33. They are principally used to support the conveyor belt 2 for transporting the dough strips or the substantially non-rigid shaped bodies.

Figure 2:
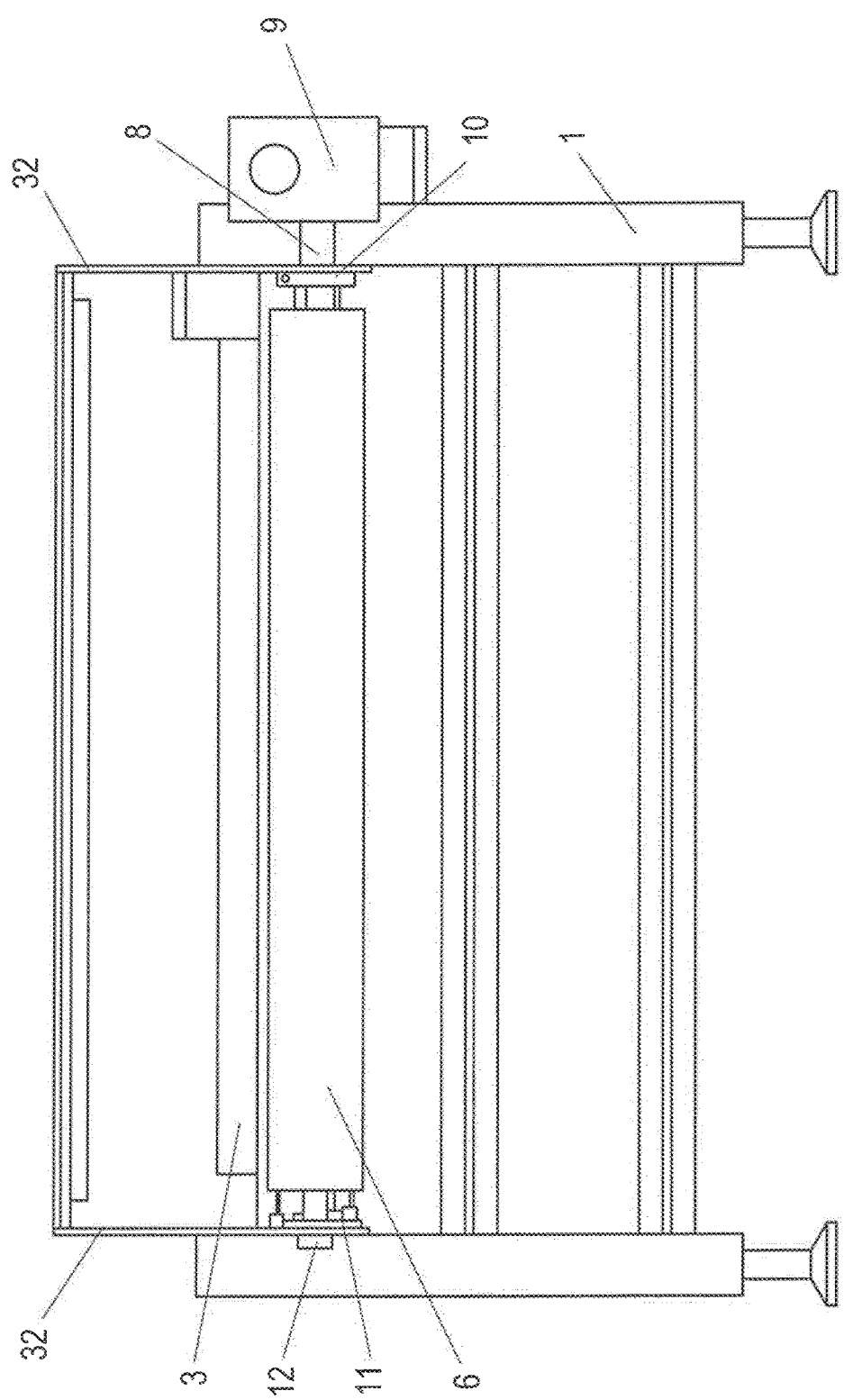
FIG. 2 shows a view of the apparatus according to the invention where the conveyor belt is blanked out.

FIG. 2 shows a view of an apparatus according to the invention where the conveyor belt 2 is blanked out. The plane of the diagram substantially corresponds to a normal plane of the vector of the transport direction 33 shown in FIG. 1. A plurality of rollers and the transfer blade 29 are provided on the machine frame 1. The deflecting rollers 3 and the drive roller 6 are mounted laterally on the machine frame 1. The drive roller 6 is mounted at the first bearing point 12 by means of a first bearing device 11. According to the invention this bearing device 11 is designed as a detachable bearing device. The pivoting apparatus 10 is provided on the other side of the drive roller 6. The drive 9 is fastened on the pivoting apparatus 10 on the one hand. On the other hand, the drive roller 6 or the drive shaft 8 is mounted in the pivoting apparatus 10.

In the operating position, the axes of rotation of the individual rollers run substantially horizontally. The machine frame 1 comprises two side plates 32 in which the bearing points for mounting the rollers are provided. In the position shown in FIG. 2 therefore, all the rollers as well as the conveyor belt 2 not shown are covered laterally by the side plates 32.

Figure 3:
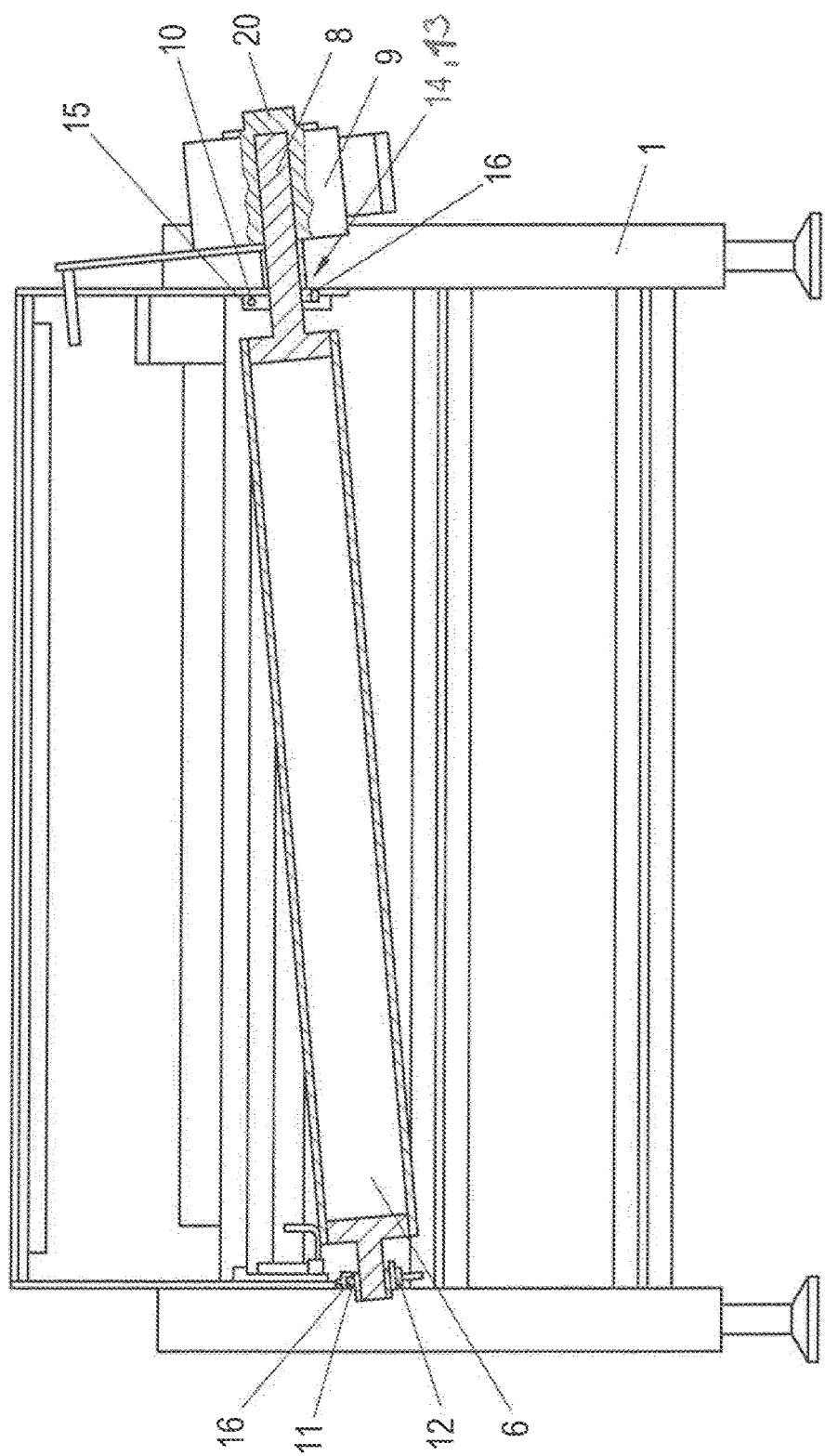
FIG. 3 shows a sectional view which substantially corresponds to the apparatus from FIG. 2—where the drive roller is pivoted.

FIG. 3 shows an apparatus which substantially corresponds to the apparatus in FIG. 2. However, the diagram in FIG. 3 is a sectional view, where the plane of intersection substantially follows the central axis or axis of rotation of the drive roller 6. Furthermore, the drive roller 6 is shown in a pivoted position. In this case, similarly to FIG. 2 the conveyor belt 2 is blanked out. Again the apparatus comprises a machine frame 1 on which the deflecting rollers 3 are mounted on both sides.

The drive roller 6 is connected on one side to the drive 9 or the drive shaft 8. The drive shaft 8 is guided through the pivoting apparatus 10 and is there mounted at a second bearing point 14. The first bearing point 12 which lies on the other side of the drive roller 6 is located in the region of the detachable bearing device 11. In the diagram in FIG. 3 the bearing device 11 is released in such a manner that the drive roller 6 can be removed from the side plates 32. A radial bearing 16 is provided in the bearing device 11, which is adapted for radial mounting of the drive roller 6. A radial bearing 16 is also provided in the pivot bearing 13, which is located in a pivot bearing block 15. The drive 9 or its housing 20 is connected to the pivot bearing block 15. When the drive roller 6 pivots out therefore, the pivot bearing block, the drive 9 connected thereto, the radial bearing 16 provided therein and the drive shaft 8 are pivoted.

Figure 4:
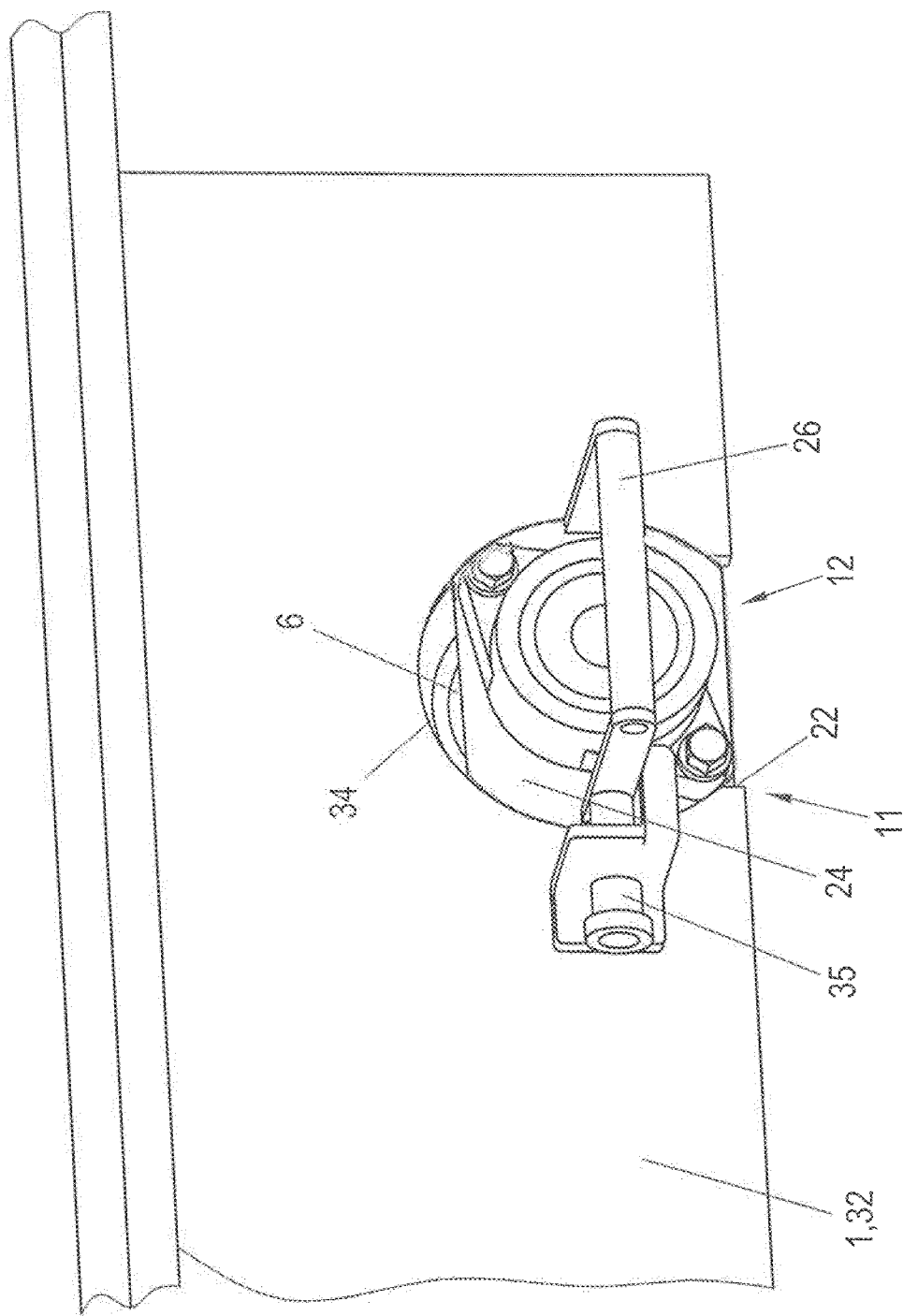
FIG. 4 shows a detailed view of the bearing device of the drive roller.

FIG. 4 shows a view of the bearing device 11 of the drive roller 6. As in the previous figures, the machine frame 1 comprises at least one, preferably two side plates 32. The deflecting rollers 3 and the drive roller 6 are mounted in the machine frame 1 and connected to the machine frame. The view shows the first bearing point 12 which is designed as a detachable bearing device 11. To this end the machine frame has a substantially circular recess 34 in which the locking element 24 is arranged and optionally can be locked or unlocked. The recess 34 has an approximately radially running opening 22. The opening 22 has a smaller size than the largest diameter of the recess 34. The locking element 24 is arranged rotatably. It is further configured in such a manner that a width of the locking element is smaller than the width of the opening 22. A further width of the locking element 24 is wider than the opening 22 but smaller than the recess 34. As a result, the locking element can be positioned in the recess 34 and locked by twisting. By turning the locking element into a position in which the narrow width can be guided through the opening 22, the drive roller 6 can be pivoted. In the diagram the bearing device 11 is locked. Furthermore the locking device has an actuating element such as, for example, the bow handle shown. Furthermore, the locking element can be blocked. In the present embodiment this is accomplished by means of the blocking apparatus 35. This is connected to the machine frame 1 and has an extension by which means a twisting of the locking element 24 can be prevented.

Figure 5:
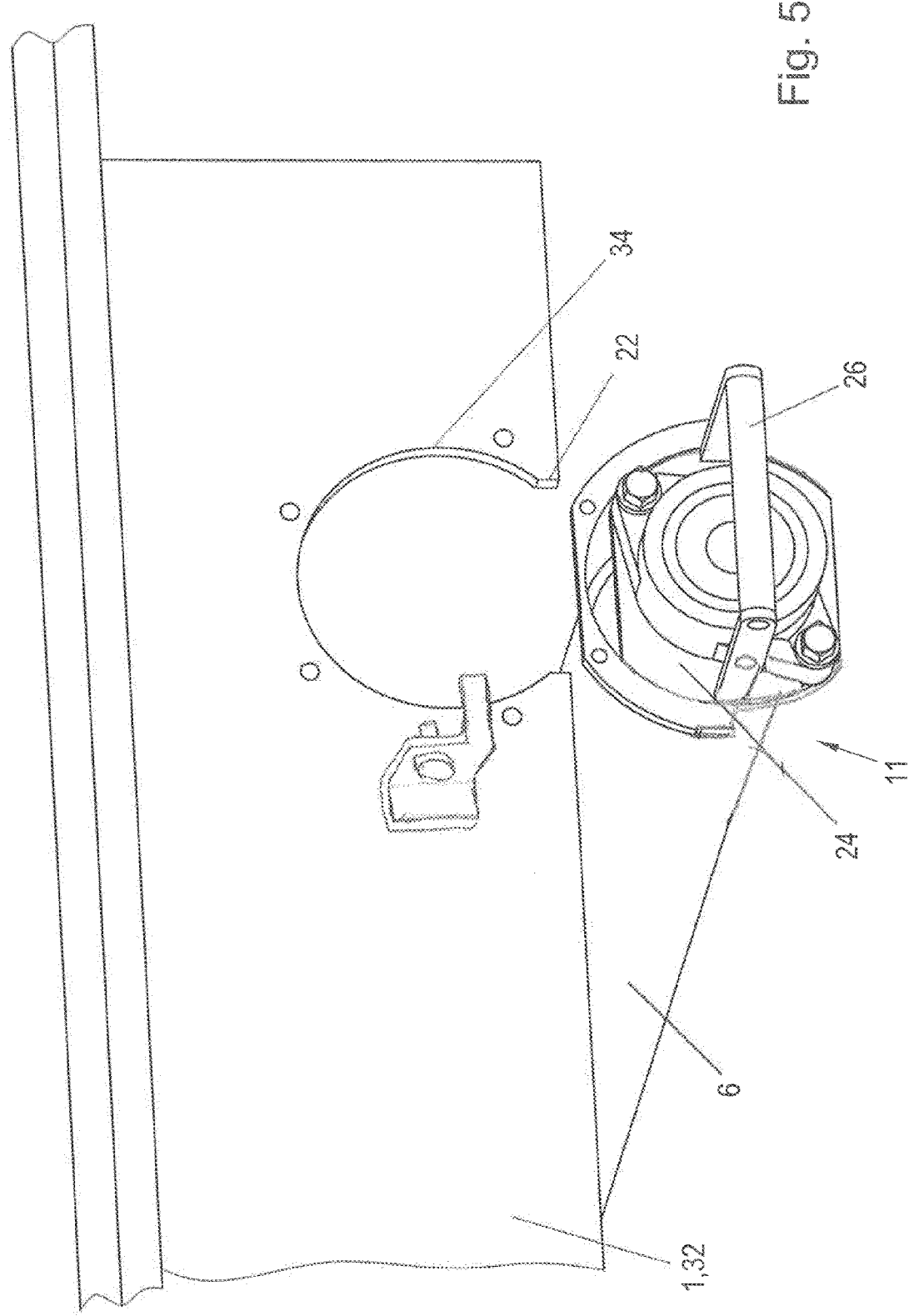
FIG. 5 shows the same view as FIG. 4 but with the drive roller pivoted.

FIG. 5 shows an apparatus similar to FIG. 4 but with pivoted drive roller 6. Again a recess 34 is provided in the machine frame 1 or in a side plate 32 which is open radially outwards by an opening 22. The bearing device 11 has a locking element 24 which in one position can be guided through the opening 22 but is locked in another position. To this end, as has already been mentioned, by turning the locking element 24 it is possible to guide it through the opening 22. In the diagram in FIG. 5, the locking element is again turned back into the base position in which insertion into the bearing point provided for this is prevented. In order to bring the drive roller 6 into the operating position, the locking element 24 must be twisted through 90°, the entire arrangement guided through the opening 22 or pivoted and subsequently the locking element 24 must be turned back again through 90° in order to effect a locking. The locking element, the radial bearing and the appurtenant bearing block remain connected to the drive roller during the pivoting and are co-pivoted.

An independent twisting of the locking element 24 can be prevented by means of the blocking apparatus 35.

In FIGS. 4 and 5, respectively one actuating element 26 is provided for the turning and actuation of the bearing apparatus 11. This is configured as a bow-shaped handle as mentioned above. As a result, no tool is advantageously required for dismantling or pivoting the drive roller 6.

Figure 6:
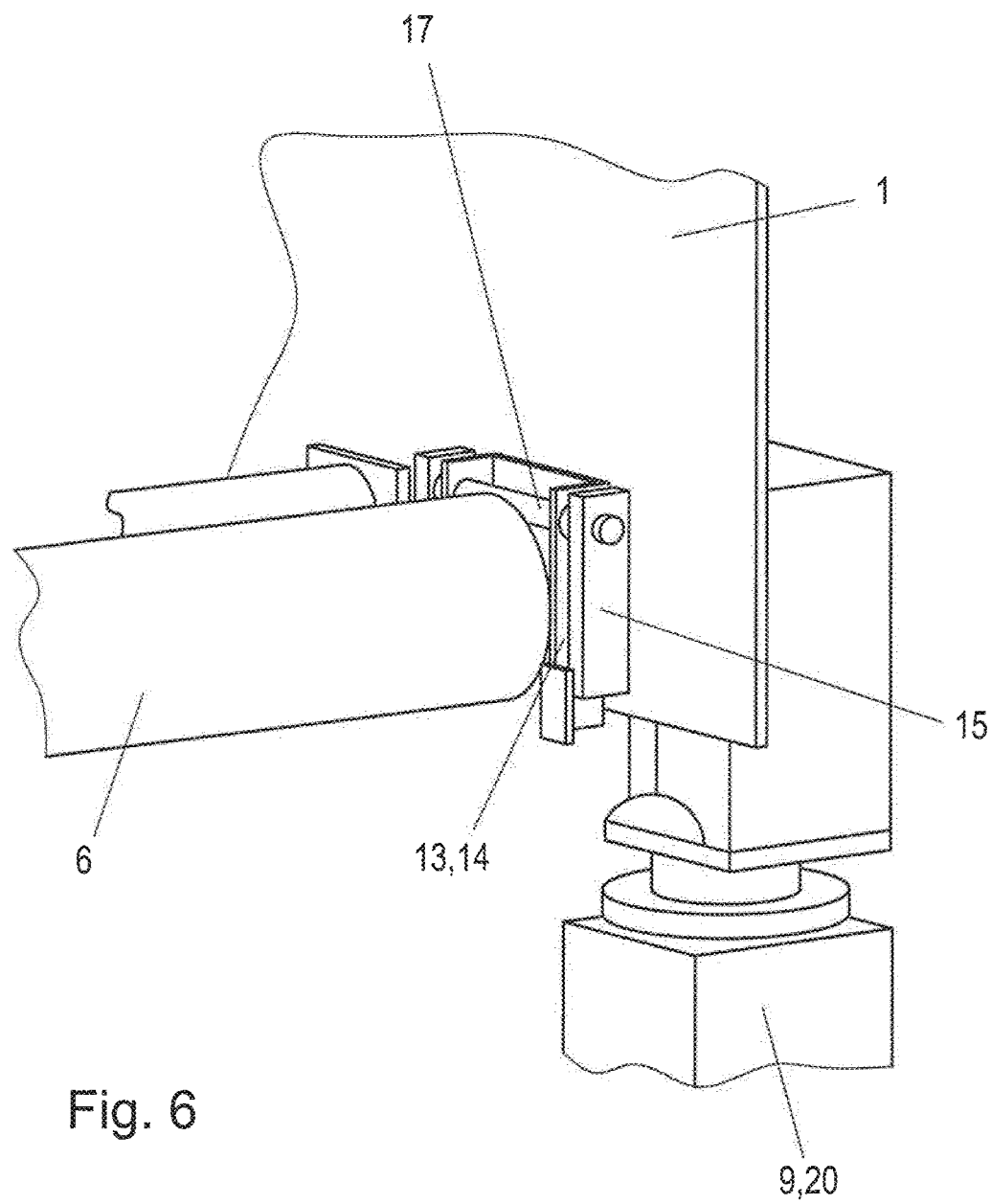
FIG. 6 shows a detailed view of the pivot bearing 13 of the apparatus.

FIG. 6 shows a detailed section of an oblique view for the detailed description of the pivot bearing 13. The drive roller 6 is mounted at the second bearing point 14 in the machine frame 1. To this end a radial bearing 16 is provided which in particular is arranged in a pivot bearing block 15. The pivot bearing block 14 is connected via a pivot axis 17 to the machine frame 1. During pivoting of the drive roller 6, consequently the pivot bearing block 15 with the radial bearing 16 arranged therein is pivoted with respect to the machine frame 1 and in particular turned about the pivot axis 17. Furthermore a drive 9 is provided which is adapted to rotationally drive the drive roller 6. To this end the drive 9 has a housing 20. The drive is connected to the pivot bearing block 15. During pivoting of the drive roller 6 therefore, the drive 9 and the housing 20 of the drive 9 are also co-pivoted. This has the advantage that the drive need not be separated from the drive roller to remove the conveyor belt.

Figure 7:
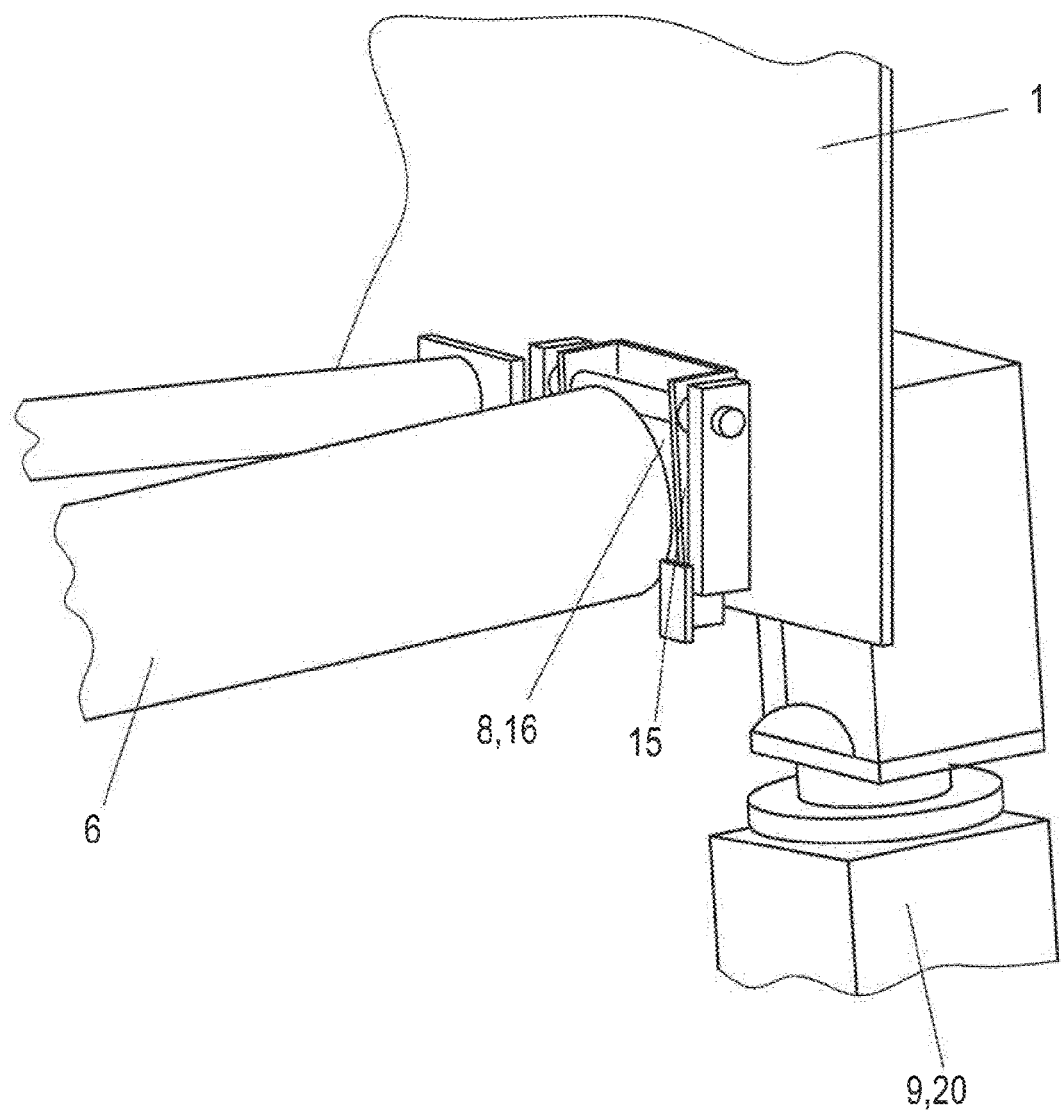
FIG. 7 shows the same view as FIG. 6 but in the pivoted position.

FIG. 7 shows the arrangement from FIG. 6 but with pivoted drive roller 6. In this case, the drive roller 6, the drive shaft 8 mounted in the radial bearing 16, the pivot bearing block 15 and the drive 9 together with housing 20 are pivoted about the pivot axis 17. Here also a substantially firm connection is made between the said components. Merely the twisting of the drive roller 6 with respect to the machine frame 1 and the pivotability about the pivot axis 17 are made possible. The twisting of the drive shaft 8 and the moving parts of the drive 9 are also not blocked.

Figure 8:
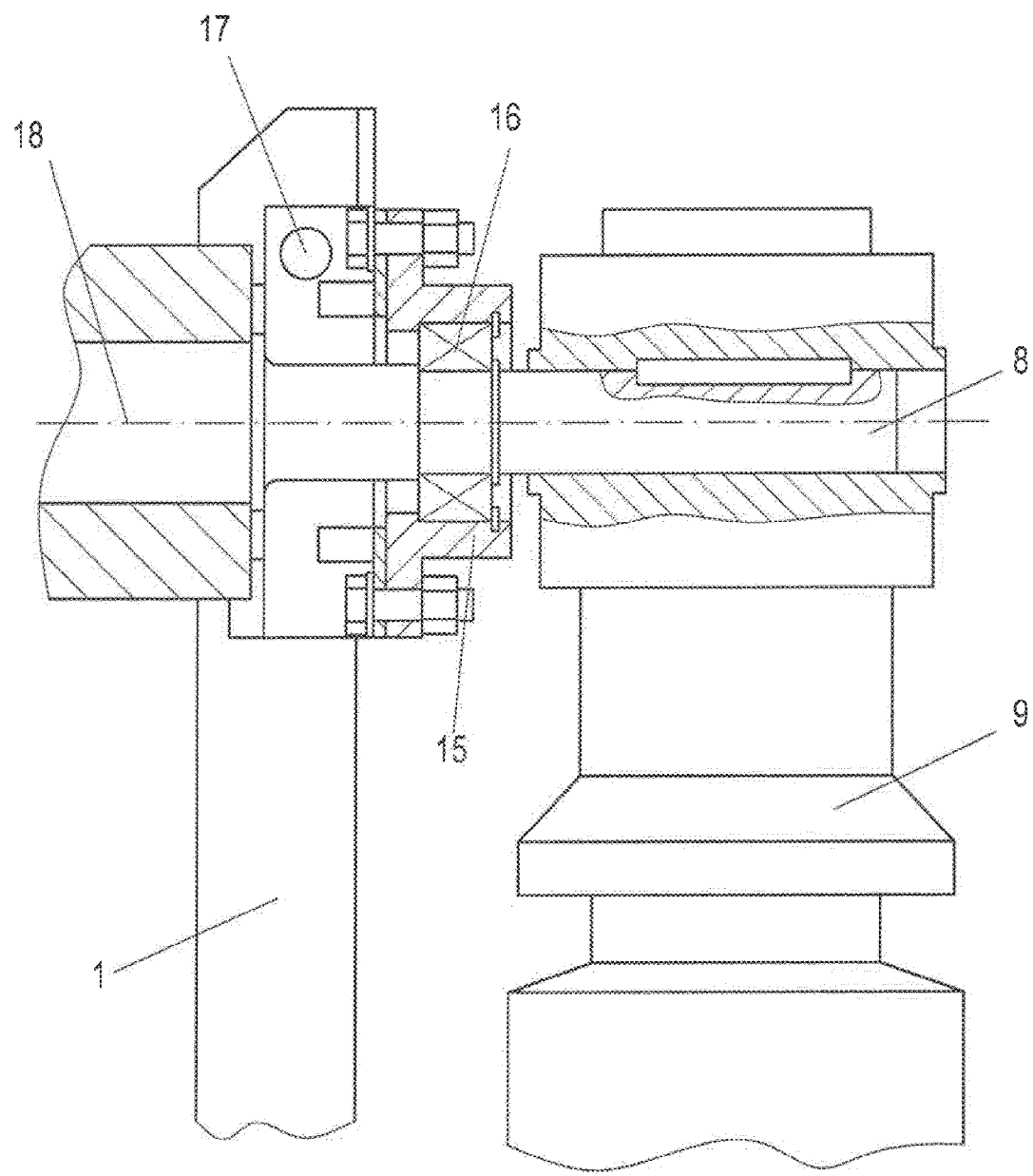
FIG. 8 shows a sectional view and in particular a detailed section of a sectional view of the pivoting apparatus.

FIG. 8 shows a sectional view of the detail from FIG. 6, where the drive roller 6 is located in a normal operating position. The drive roller 6 or the axis of rotation 18 thereof runs in this case for example substantially horizontally.

The drive 9 drives the drive shaft 8 rotationally. This runs coaxially with the drive roller 6. Optionally the drive shaft 8 is a part of the drive roller 6. The drive shaft 8 or the drive roller 6 are mounted by means of a radial bearing 16 with respect to the machine frame 1. This radial bearing 16 is in particular held in the pivot bearing block 15. The pivot bearing block 15 is pivotable about a pivot axis 17 with respect to the machine frame 1. Similarly to the description of the previous figures, the pivotability of the drive roller 6 is thereby made possible.

Figure 9:
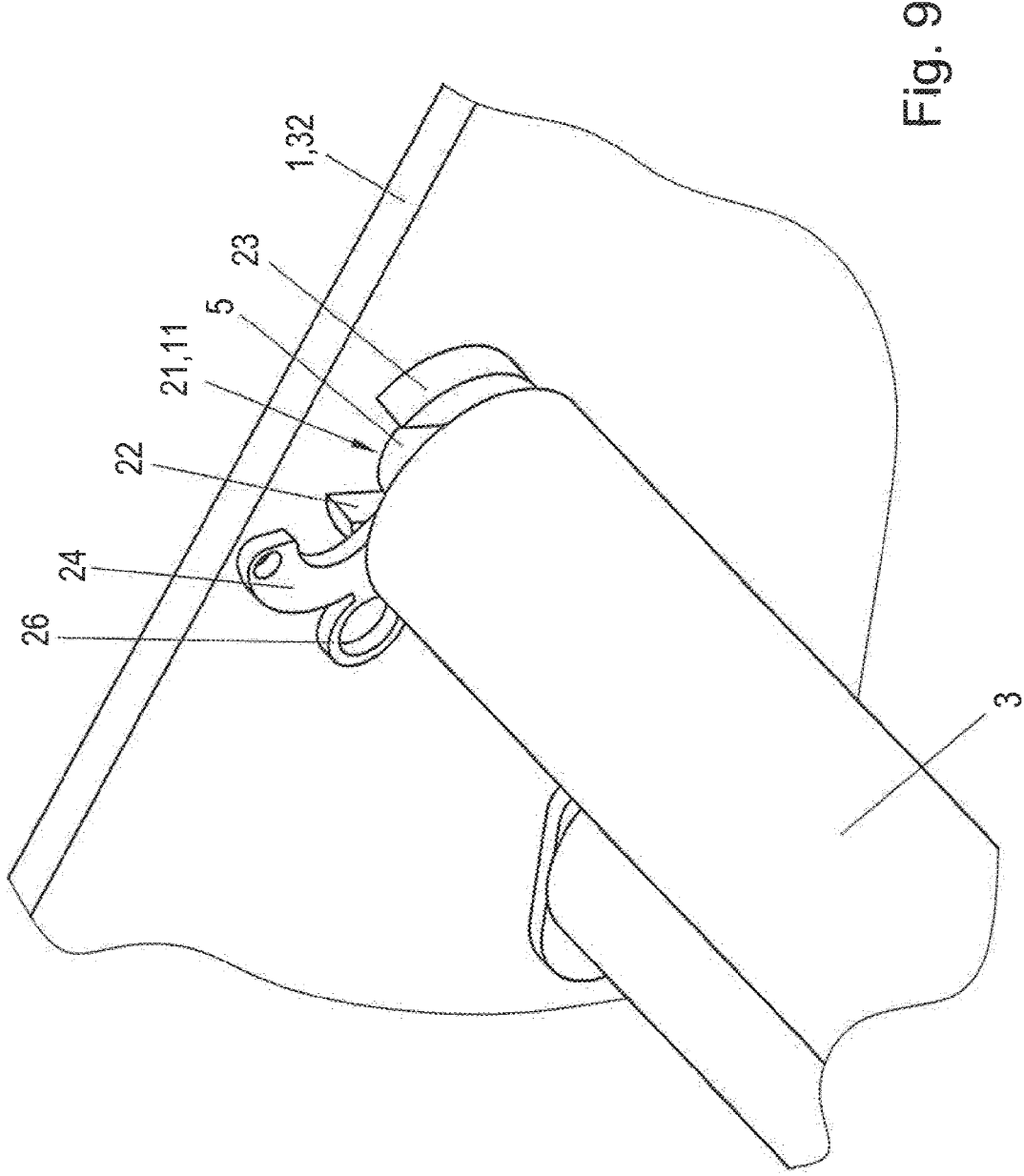
FIG. 9 shows a bearing device of a deflecting roller in the open state.

FIG. 9 shows an oblique view of a detail of a deflecting roller 3. This is mounted laterally in the machine frame 1 and in particular on a side plate 32. To this end a detachable bearing device 11 is provided at the bearing point 21. This comprises a deflecting roller bearing block 23 as well as a locking element 24. An actuating element 26 is preferably provided on the locking element 24. The deflecting roller bearing block 23 comprises an opening 22. Through this the deflecting axis 5 of the deflecting roller 3 can be removed from the deflecting roller bearing block 23. For locking and fixing the deflecting roller 3, the deflecting roller bearing block 23 can be closed by means of the locking element 24. When the locking element is closed, the deflecting roller 3 can rotate about its central longitudinal axis. However removal of the roller is prevented. When the locking element 24 is opened, it is possible to remove the deflecting roller 3. FIG. 9 shows the open position of the deflecting roller bearing block 23.

Figure 10:
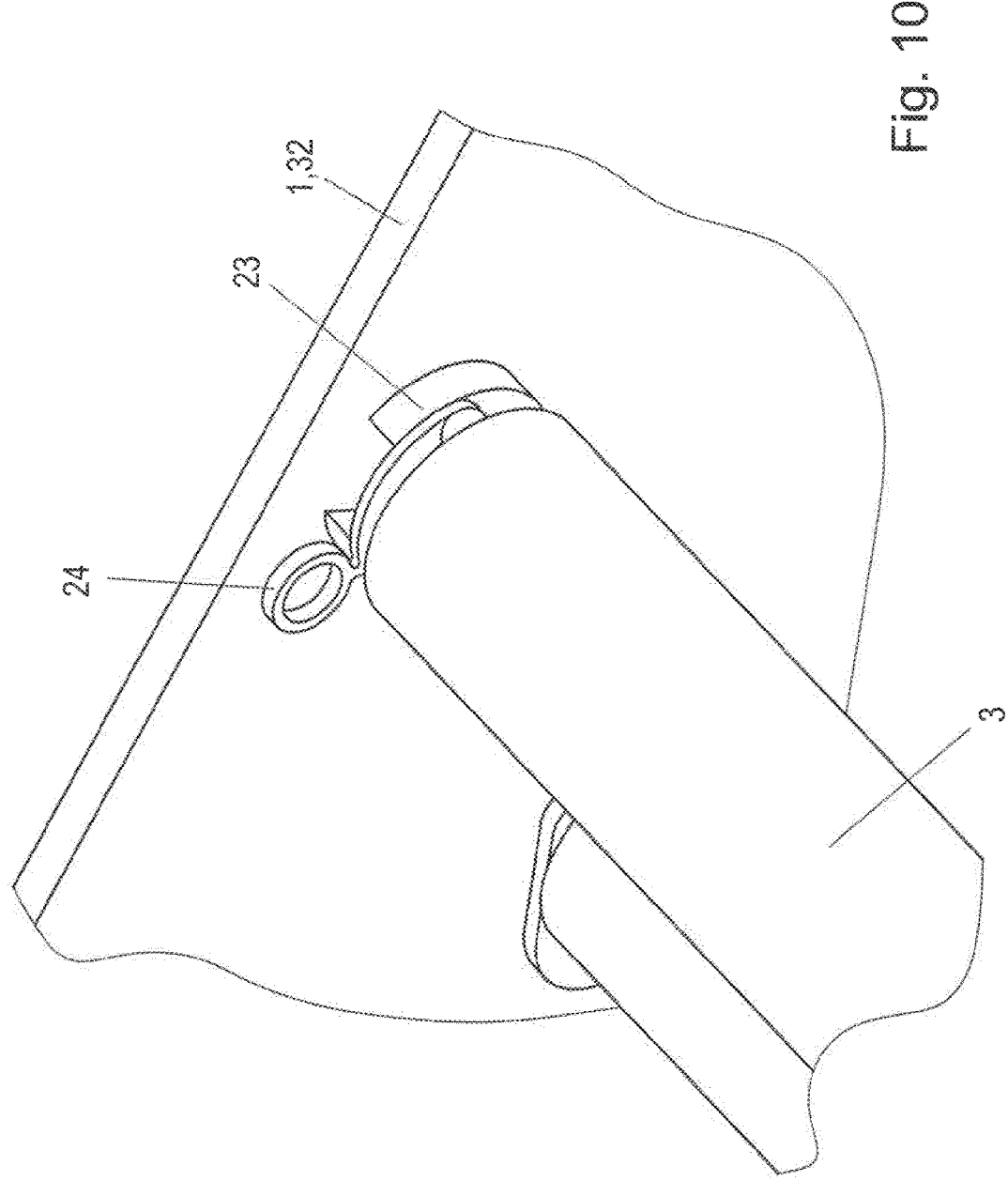
FIG. 10 shows the same arrangement as FIG. 9 but in the closed state.

FIG. 10 shows the same arrangement but in this view the deflecting roller bearing block 23 is locked by the locking element 24. Consequently the deflecting roller 3 or its axis is mounted rotationally and fixed relative to the machine frame 1.

Figure 11:
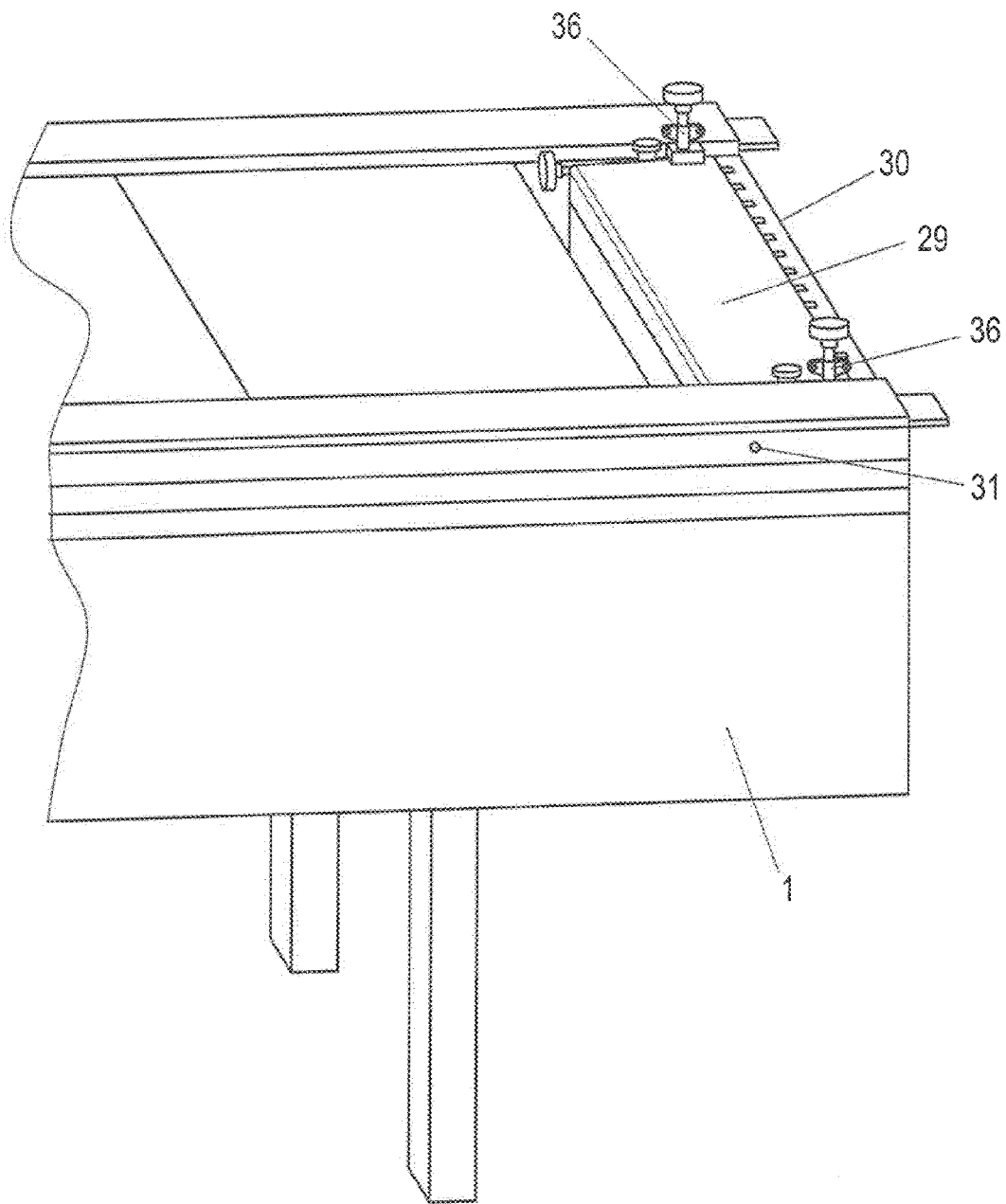
FIG. 11 shows an oblique view of a detail of the apparatus where the transfer blade is in the operating position.

FIG. 11 shows a further view of the apparatus according to the invention. The conveyor belt is blanked out in this view in order to be able to describe the operating mode of the transfer blade 29. This is connected to the machine frame 1. FIG. 11 shows the transfer blade in the operating position. The upper surface substantially follows the transport direction of the conveyor belt. The transfer blade 29 is fixed in a position by means of connecting elements 36 which are designed, for example, as tommy screws. The transfer blade 29 has a transfer edge 30. The conveyor belt 2 is optionally sharply deflected over this transfer edge 30 in order to enable a transfer of substantially non-rigid shaped bodies. When the connecting elements 36 are released, the transfer blade 29 can be pivoted about a transfer blade pivot axis 31.

Figure 12:
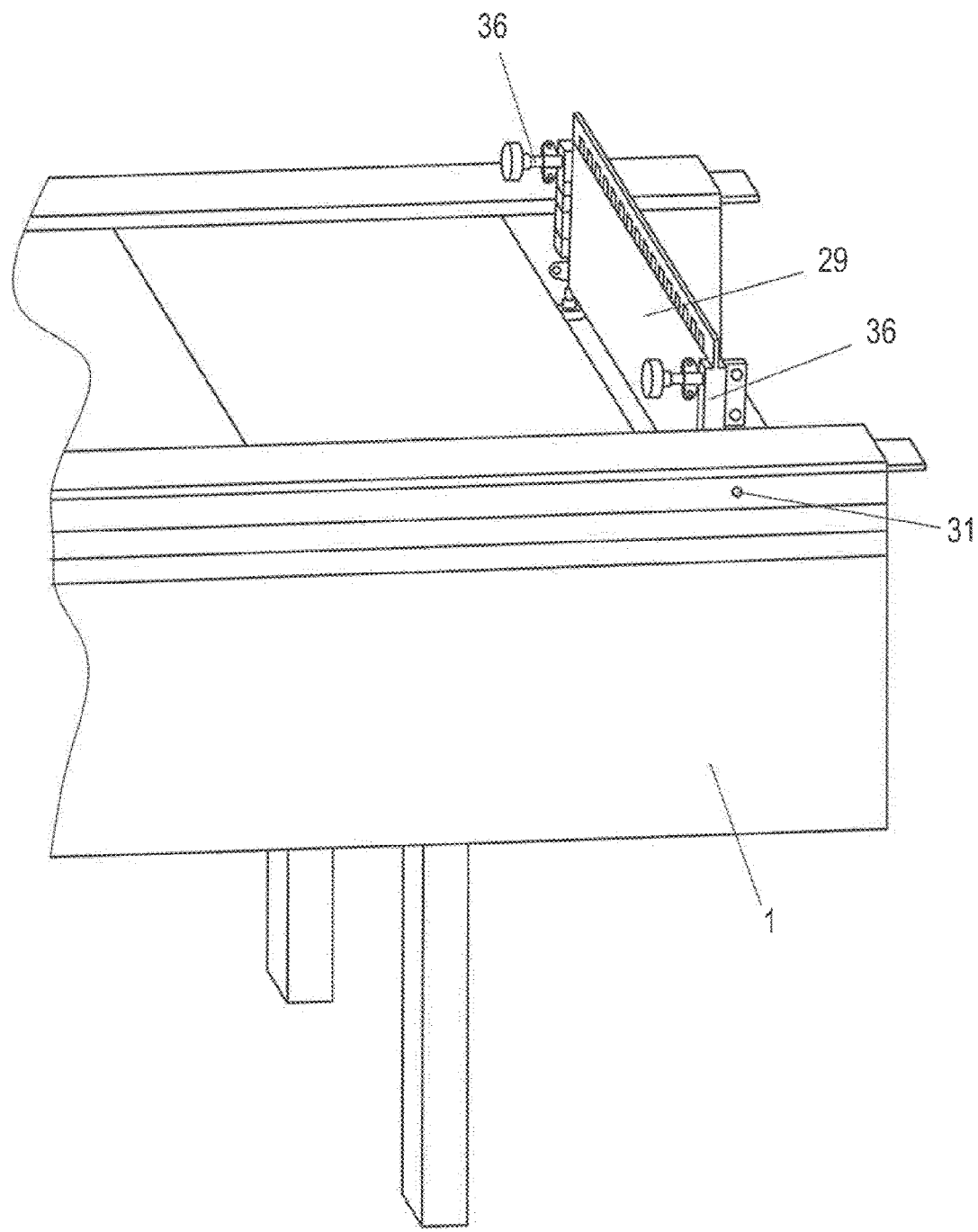
FIG. 12 shows the same view as FIG. 11 but with the transfer blade folded up.

FIG. 12 shows the transfer blade 29 in the upright position. Here the transfer blade 29 is turned with respect to the position from FIG. 11 by about 90° about the transfer blade pivot axis 31. The connecting elements 36 are released here so that no fixing on the machine frame 1 is achieved. By means of this configuration the strain on the conveyor belt 2 which is not shown in this view, is relieved.

Removal of the transfer blade 29 is made possible. Optionally other connecting elements 36 are provided for fixing the transfer blade 29 on the machine frame 1 which must be released to be able to remove the transfer blade 29.

REFERENCE LIST

1. Machine frame
2. Conveyor belt
3. Deflecting roller
4. Inner side of conveyor belt 5. Deflecting axis
6. Drive roller
7. —
8. Drive shaft
9. Drive
10. Pivoting apparatus
11. Bearing device
12. First bearing point (drive shaft)
13. Pivot bearing
14. Second bearing point (pivot bearing)
15. Pivot bearing block
16. Radial bearing
17. Pivot axis
18. Axis of rotation
19. Output shaft
20. Housing
21. Bearing point deflecting roller
22. Opening
23. Deflecting roller bearing block
24. Locking element
25. Width
26. Actuating element
27. Tensioning roller
28. Outer side of conveyor belt
29. Transfer blade
30. Transfer edge
31. Transfer blade pivot axis
32. Side plate
33. Transport direction
34. Recess
35. Blocking apparatus
36. Connecting element
37. Table plates

The invention claimed is:

1. An apparatus for transporting endless dough strips, substantially non-rigid shaped bodies or biscuit dough shaped bodies, the apparatus comprising:
    a machine frame;
    a closed circulating conveyor belt having an inner side;
    at least one deflecting roller contacting said inner side of said conveyor belt for deflection of said conveyor belt, said at least one deflecting roller having a deflection axle mounted rotationally laterally on said machine frame;
    a drive roller contacting said inner side of said conveyor belt for driving said conveyor belt, said drive roller having a drive shaft mounted rotationally laterally on said machine frame;
    a drive driving said drive shaft of said drive roller;
    quick release fasteners implemented as detachable bearing devices for unlocking and removing said at least one deflecting roller; and
    a pivoting apparatus connecting said drive roller to said machine frame.

2. The apparatus according to claim 1, wherein:
    said drive shaft of said drive roller has first and second bearing points; and
    said pivoting apparatus includes a detachable bearing apparatus for said first bearing point and a pivotable pivot bearing for said second bearing point in said machine frame, permitting a pivoting of said drive shaft and said drive roller relative to said machine frame.

3. The apparatus according to claim 1, wherein:
    said pivot bearing includes a pivot bearing block;
    a radial bearing is provided in said pivot bearing block for mounting said drive shaft; and
    a pivot axle connects said pivot bearing to said machine frame permitting said pivot bearing block and said drive shaft mounted therein to be pivoted.

4. The apparatus according to claim 3, wherein said drive shaft has an axis of rotation extending in a direction, and said pivot axle extends in a direction different than said direction of said axis of rotation of said drive shaft.

5. The apparatus according to claim 4, wherein said direction of said pivot axle is substantially normal to said direction of said axis of rotation of said drive shaft.

6. The apparatus according to claim 3, wherein said drive has an output shaft rotatably connected to said drive shaft, and said drive has a housing substantially rigidly connected to said pivot bearing block.

7. The apparatus according to claim 6, wherein said drive roller, said drive shaft of said drive roller mounted in said radial bearing, said pivot bearing block and said drive together with said housing are pivotable about said pivot axle relative to said machine frame.

8. The apparatus according to claim 1, wherein said at least one deflecting roller has bearing points each being constructed as said detachable bearing devices.

9. The apparatus according to claim 1, wherein said detachable bearing devices of said at least one deflecting roller include a deflecting roller bearing block and a locking element, said deflecting roller bearing block having an opening running substantially in radial direction for inserting and removing said deflection axle and said locking element being configured to close said opening.

10. The apparatus according to claim 9, wherein said pivot axle has a diameter, and said opening of said deflecting roller bearing block has a width being greater than said diameter of said pivot axle.

11. The apparatus according to claim 9, which further comprises an actuating element for moving said locking element.

12. The apparatus according to claim 11, wherein said actuating element is a tool-less operable actuating element, a lever, a lock or a slider.

13. The apparatus according to claim 1, wherein said conveyor belt has an outer side, and a tensioning roller is pressed onto said outer side of said conveyor belt for tensioning said conveyor belt.

14. The apparatus according to claim 1, which further comprises a transfer blade having a transfer edge about which said conveyor belt is deflected.

15. The apparatus according to claim 14, which further comprises a transfer blade pivot axle pivotably connecting said transfer blade to said machine frame.

16. The apparatus according to claim 14, wherein said transfer blade is connected laterally to said machine frame with a detachable connection permitting said transfer blade to be removed.

17. The apparatus according to claim 14, wherein said at least one deflecting roller and said transfer blade are removably connected to said machine frame and said drive roller is pivotably connected to said machine frame, permitting said closed circulating conveyor belt to be changed without dismantling said drive roller.

18. The apparatus according to claim 17, which further comprises table plates removably connected to said machine frame.

19. The apparatus according to claim 1, wherein:
    said machine frame includes a side plate having a recess formed therein as part of a detachable bearing device for said drive roller, said recess being opened outwardly by a radially running opening having a width; and said drive roller has a rotatable locking element, said locking element has a width being smaller than said width of said opening and a further width being wider than said opening but smaller than said recess, permitting said locking element to be positioned in said recess and locked by twisting.

\* \* \* \* \*